(12) United States Patent
Lietzenmaier

(10) Patent No.: US 10,274,043 B2
(45) Date of Patent: Apr. 30, 2019

(54) COUNTERBALANCE AND TORQUE TRANSMISSION DEVICE

(71) Applicant: Schaeffler Technologies AG & Co. KG, Herzogenaurach (DE)

(72) Inventor: Holger Lietzenmaier, Lauf (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 321 days.

(21) Appl. No.: 15/101,644

(22) PCT Filed: Nov. 28, 2014

(86) PCT No.: PCT/DE2014/200668
§ 371 (c)(1),
(2) Date: Jun. 3, 2016

(87) PCT Pub. No.: WO2015/081952
PCT Pub. Date: Jun. 11, 2015

(65) Prior Publication Data
US 2017/0002895 A1    Jan. 5, 2017

(30) Foreign Application Priority Data

Dec. 6, 2013  (DE) .................... 10 2013 225 126

(51) Int. Cl.
*F16D 13/58* (2006.01)
*F16D 21/06* (2006.01)
(Continued)

(52) U.S. Cl.
CPC .............. *F16F 15/34* (2013.01); *F16D 13/58* (2013.01); *F16D 21/06* (2013.01); *F16F 15/32* (2013.01);
(Continued)

(58) Field of Classification Search
CPC .. F16D 13/58; F16D 21/06; F16D 2021/0607; F16D 2021/0615;
(Continued)

(56) References Cited

U.S. PATENT DOCUMENTS

| 2,385,252 | A | * | 9/1945 | Bennett, Jr. | F16F 15/32 |
| | | | | | 16/404 |
| 4,417,651 | A | * | 11/1983 | Lu | F16D 13/585 |
| | | | | | 192/112 |
| 5,661,938 | A | * | 9/1997 | Ditka | F16B 15/06 |
| | | | | | 411/452 |
| 6,062,788 | A | * | 5/2000 | Ying-Feng | B25C 1/00 |
| | | | | | 411/439 |

(Continued)

FOREIGN PATENT DOCUMENTS

| CN | 1127333 | 7/1996 |
| CN | 202125532 | 1/2012 |

(Continued)

*Primary Examiner* — Richard M Lorence
(74) *Attorney, Agent, or Firm* — Volpe and Koenig, P.C.

(57) ABSTRACT

A counterbalance for balancing a part that is able to rotate about an axis of rotation is disclosed, in particular a part of a torque transmission device, such as a friction clutch unit. The counterbalance has a longitudinal axis and a shaft section that includes a knurled portion with ridges that are inclined in relation to the longitudinal axis. Also disclosed is a torque transmission device, in particular for a drive train in a motor vehicle, including an axis of rotation and at least one part that is able to rotate about the axis of rotation. In this torque transmission device, at least one counterbalance of said type is arranged on the part for balancing purposes.

20 Claims, 3 Drawing Sheets

(51) Int. Cl.
*F16F 15/32* (2006.01)
*F16F 15/34* (2006.01)

(52) U.S. Cl.
CPC .. *F16D 2021/0607* (2013.01); *F16D 2300/22* (2013.01)

(58) Field of Classification Search
CPC ....... F16D 2300/22; F16F 15/32; F16F 15/34; F16B 19/06
See application file for complete search history.

(56) References Cited

U.S. PATENT DOCUMENTS

| | | | |
|---|---|---|---|
| 6,354,419 B1* | 3/2002 | Dalbiez | F16D 13/58 192/110 R |
| 2009/0223773 A1 | 9/2009 | Ruehle | |
| 2015/0075938 A1 | 3/2015 | Hauss et al. | |

FOREIGN PATENT DOCUMENTS

| | | |
|---|---|---|
| DE | 19926383 | 12/2000 |
| DE | 102009007829 | 9/2009 |
| DE | 102013208456 | 11/2013 |
| DE | 102013208669 | 11/2014 |
| EP | 1043512 | 10/2000 |

\* cited by examiner

COUNTERBALANCE AND TORQUE TRANSMISSION DEVICE

BACKGROUND

The invention relates to a counterbalance for balancing a part that can rotate about an axis of rotation, particularly a part of a torque transmission device, such as a friction clutch device, with the counterbalance comprising a longitudinal axis and a shaft section. Additionally the invention relates to a torque transmission device, particularly for a drive train of a motor vehicle, comprising an axis of rotation and at least one part that can rotate about the axis of rotation.

A friction clutch is known from DE 10 2009 007 829 A1 comprising at least one clutch housing, at least one compression plate connected thereto in a torque-proof fashion however axially displaceable to a limited extent, as well as actuator effective between the clutch housing and the compression plate for the axial impingement of the compression plate with force, in which at least one part forming the friction clutch includes recesses for balancing the friction clutch, allowing threaded elements to be inserted therein to act as counterbalance. According to DE 10 2009 007 829 A1 the threaded elements exhibit a threaded section and a head formed as the balance weight. The balance element has engagement areas for an assembly tool, in order to insert the balance elements into the recesses. The threaded elements form self-cutting and/or self-tapping screw threads, which allow the use of smooth recesses.

A cylindrical counterbalance is known from the German patent application with the reference 10 2013 208 669.5 for balancing a part rotating about an axis of rotation, particularly a part of a torque transmission device, such as a friction clutch device, comprising a longitudinal axis, a first longitudinal section with a first end and a second longitudinal section with a second end, in which the first end can be impacted by a locking force in the axial direction and the second longitudinal section can be deformed plastically to generate a form-fitting connection.

SUMMARY

The invention is based on the objective of improving the design and/or function of the counterbalance mentioned at the outset. In particular, a more secure fastening of the counterbalance at the part is to be ensured, even under vibrations. In particular, any unintended loosening of the counterbalance should be prevented under vibrations. In particular, it should be possible to securely fix the counterbalance with its center of gravity inside a part. In particular, it should be possible to connect the counterbalance to the part in a friction-fitting fashion that is more robust than in prior art. In particular, any stress of the friction-fitting connection should be reduced. In particular, it should be possible to support any friction-fitting connection with the help of a form-fitting connection. Additionally, a torque transmission device is provided comprising at least one such counterbalance.

The objective is attained in a counterbalance for balancing a part that can be rotated about an axis of rotation, particularly a part of a torque transmission device, such as a friction clutch device, with the counterbalance having a longitudinal axis and a shaft section, with the shaft section exhibiting a knurl provided with ridges inclined in reference to the longitudinal axis.

The part may represent a driving collar. The part may be a housing, a tie bar, a lid, a pressure cup, a lever spring, or a central plate.

The counterbalance may have a cylindrical form. The counterbalance may have a pin-like form. The counterbalance may be in the form of a step pin. The counterbalance may have a head section. The counterbalance may have an axial contact area. The axial contact area may be formed at the head section. The axial contact area may be aligned towards the shaft section. The counterbalance may include a foot section. The counterbalance may have a greater diameter at the head section than at the shaft section. The counterbalance may have a smaller diameter at the foot section than at the shaft section. The counterbalance may be embodied beveled at the end.

The ridges may be arranged distributed in the circumferential direction at the shaft section. The ridges may be non-parallel in reference to the longitudinal axis. The ridges may serve to reinforce a friction-fitting connection of the counterbalance with the part. The ridges may be embodied in a helical fashion. The ridges may be inclined in reference to the longitudinal axis from approx. 3° to approx. 15°, particularly from approx. 6° to approx. 12°, more particularly by approx. 9°. The ridges may be inclined in the circumferential direction of the shaft section. The ridges may be helical about the longitudinal axis with such a high pitch that the shaft section is only partially wrapped by each ridge. The ridges may have such a pitch that during the assembly a purely axial impingement with force occurs upon the counterbalance causing the counterbalance to rotate. The ridges may each include flanks with a flank angle from approx. 40° to approx. 80°, particularly from approx. 50° to approx. 70°, more particularly of approx. 60°. The ridges may each have a depth from 6% to 10%, particularly from approx. 7% to approx. 9%, more particularly measuring approx. 8% of an exterior diameter of the shaft section. The counterbalance may have a center of gravity, which is arranged in the area of the shaft section. The counterbalance may potentially be fixed at the part in a friction and form-fitting fashion.

Additionally, the objective underlying the invention is attained with a torque transmitting device, particularly for a drive train of a motor vehicle, comprising an axis of rotation and at least one part that can be rotated about an axis of rotation, with at least one such counterbalance being arranged on the part for balancing.

The torque transmission device can particularly serve for an arrangement in a drive train of a motor vehicle driven by an internal combustion engine. The torque transmission device may represent a friction clutch device. The friction clutch device may include at least one friction clutch. The friction clutch device may have a single friction clutch. The friction clutch device may have a simple clutch. The friction clutch device may have two friction clutches. The friction clutch device may have a duplex clutch. The torque transmission device may have at least one pressure plate. The torque transmission device may include at least one compression plate. The torque transmission device may include a housing. The housing may include a lid. The housing may include a pressure cup. At least one compression plate may be displaceable in the axial direction for operation purposes between an engaged operating position and a disengaged operating position in reference to at least one pressure plate.

The friction clutch device may be arranged in the drive train between an internal combustion engine and a transmission. The friction clutch device may have a clutch input part. The clutch input part may be connected in a driven fashion to an output shaft of the internal combustion engine. The friction clutch device may have at least one clutch output part. The friction clutch device may include a single clutch output part. The friction clutch device may include a first clutch output part and a second clutch output part. At least one clutch output part may be connected in a driving fashion to an input shaft of the transmission.

At least one counterbalance may serve to balance the torque transmission device. Several counterbalances may be arranged distributed in the circumferential direction. The counterbalance may have a predetermined weight. At least one counterbalance may be arranged at a predetermined radial position. At least one counterbalance may be arranged at a predetermined position in the circumferential direction.

Starting from a completely open actuator position, in which essentially no mechanical power transmission occurs between the clutch input part and the clutch output part, to a completely closed actuator position, in which essentially a complete power transmission occurs between the clutch input part and the clutch output part, a friction clutch may allow an increasing power transmission depending on actuation, with said power transmission occurring in a friction-fitting fashion between the clutch input part and the clutch output part. Inversely, starting from a completely closed actuator position, in which essentially a complete power transmission occurs between the clutch input part and the clutch output part, to a completely open actuator position, in which essentially no power transmission occurs between the clutch input part and the clutch output part, reducing power transmission shall be possible based on actuation. The friction clutch device may allow mechanical power transmission between the clutch input part on the one side and the first clutch output part and/or the second clutch output part on the other side in a transitional change.

The friction clutch device may be a single disk clutch. The friction clutch device may be a multi disk clutch. The friction clutch device may be a dry clutch. The friction clutch device may be a wet clutch. The friction clutch device may be a compressed clutch. The friction clutch device may be a tensile clutch. The friction clutch device may be actuated via a clutch pedal. The friction clutch device may be actuated automatically.

The clutch input part may include at least one pressure plate, comprising at least one compression plate and the housing. The at least one pressure plate and the housing may be connected fixed to each other. The at least one compression plate and the housing may be connected to each other in a torque-proof fashion. The clutch output part may include at least one clutch disk. The at least one clutch disk may include friction coatings. At least one clutch disk may be clamped for a friction-fitting power transmission between at least one pressure plate and at least one compression plate. The at least one pressure plate may also be called the central plate.

The friction clutch device may include an actuator device. The actuator device may acts upon at least one compression plate. The actuator device may act between the housing and at least one compression plate. The actuator device may rest with one side on the housing and with the other side on at least one compression plate. The actuator device may have at least one lever spring. The actuator device may have a tie rod.

Summarizing and stated in other words, here the invention results among other things in a friction-fitting balance weight with a spiral-shaped knurl. The knurl may be arranged helically. The knurl may extend in a spiral about the axis of rotation of the balance element. The arrangement may be equivalent to a screw with a very high pitch, allowing the balance element itself to rotate during the assembly process without requiring any additional rotary drive.

The invention ensures secure fastening of the counterbalance at a part even under vibrations. Any unintended loosening of the counterbalance under vibrations is prevented. The counterbalance can securely be fixed with its center of gravity inside the part. The counterbalance can be connected to a part in a friction-fitting fashion with increased robustness. Any stress of a friction-fitting connection is reduced. Any friction-fitting connection can be supported with the help of a form-fitting connection. Additionally, a torque transmission device is provided showing at least one such counterbalance.

BRIEF DESCRIPTION OF DRAWINGS

In the following, an exemplary embodiment of the invention is described in greater detail with reference to the drawings. Additional features and advantages are discernible from this description.

Shown schematically and as an example are.

DETAILED DESCRIPTION OF PREFERRED EMBODIMENTS

Figure 1:
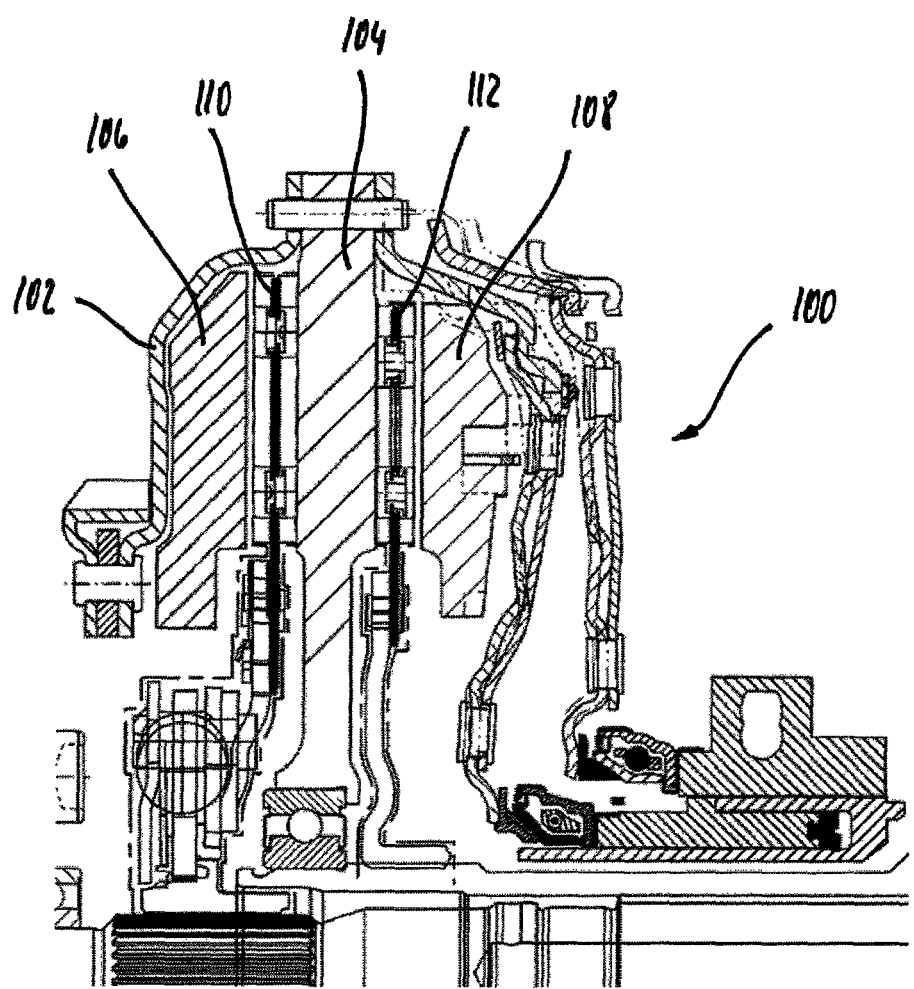
FIG. 1 a duplex clutch with a driving collar.

FIG. 1 shows a duplex clutch 100 with a driving collar 102. The duplex clutch 100 serves for the arrangement in a drive train of a motor vehicle between an internal combustion engine and a transmission. The duplex clutch 100 has an input part, a first output part, and a second output part. The duplex clutch 100 serves to allow a start-up operation as well as changing the transmission ratio. With the help of the duplex clutch 100 the input part on the one side and the first output part and/or the second output part on the other side can be connected to each other or disconnected from each other. Additionally, a power flow can be shifted from the input part in a transitional change from the first output part to the second output part and vice versa. This way, driving is possible free from an interruption in the drive force.

The duplex clutch 100 includes a pressure plate 104, a first compression plate 106, and a second compression plate 108. The driving collar 102 and the pressure plate 104 are connected fixed to each other, in the present case they are riveted. The first compression plate 106 and the second compression plate 108 are each connected to the pressure plate 104 in a torque-proof fashion and connected to the pressure plate 104 in an axially displaceable fashion. The duplex clutch 100 includes a first clutch disk 110 and a second clutch disk 112. The first clutch disk 110 can be clamped between the pressure plate 104 and the first compression plate 106 in order to transmit mechanical power in a friction-fitting fashion. The second clutch disk 112 can be clamped between the pressure plate 104 and the second compression plate 108 for the transmission of mechanical power in a friction-fitting fashion.

Figure 2:
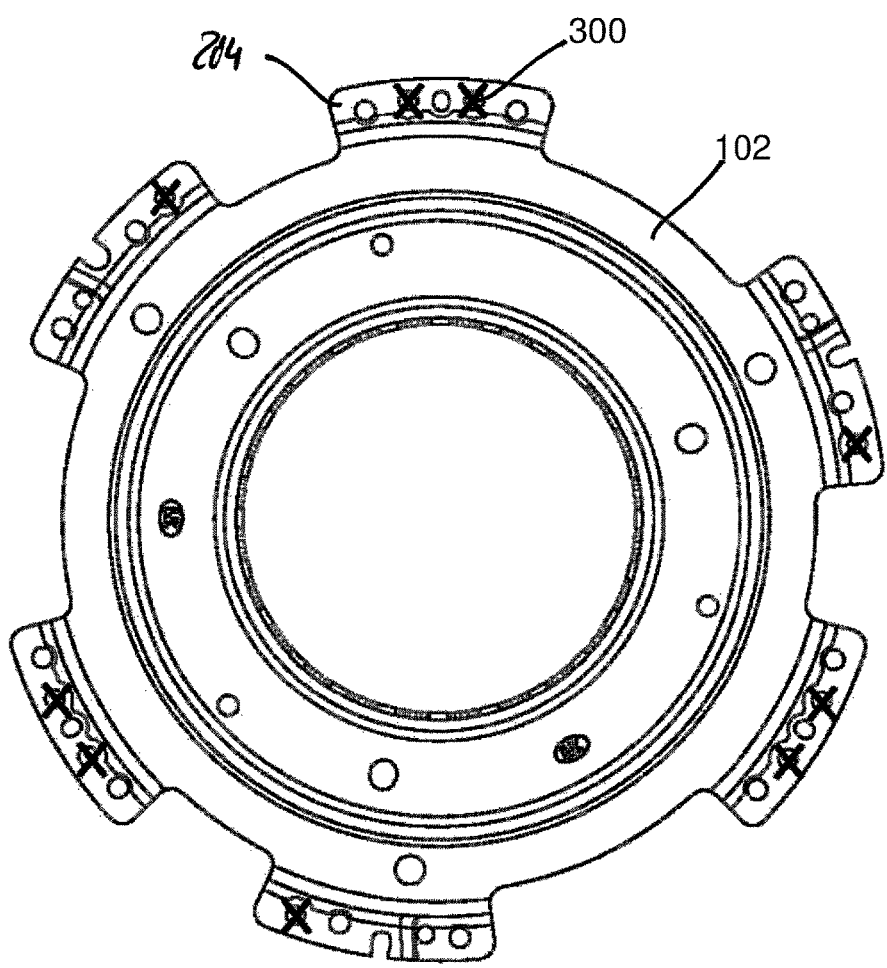
FIG. 2 a driving collar of a duplex clutch with counterbalances.

FIG. 2 shows the driving collar 102 according to FIG. 1, of a duplex clutch with counterbalances, such as 300. The driving collar 102 has a lid-like shape. The driving collar 102 includes flap-like projections pointing radially towards the outside, such as 204. With the projections 204 the driving collar 102 can be connected to a pressure plate, particularly with rivets. The projections 204 include holes. The counterbalances 300 are arranged at the projections 204. The counterbalances 300 are arranged in the holes. The counterbalances 300 serve for balancing the driving collars 102. Accordingly, the counterbalances 300 each have an adjusted weight and an adjusted arrangement at the driving collar 102.

Figure 3:
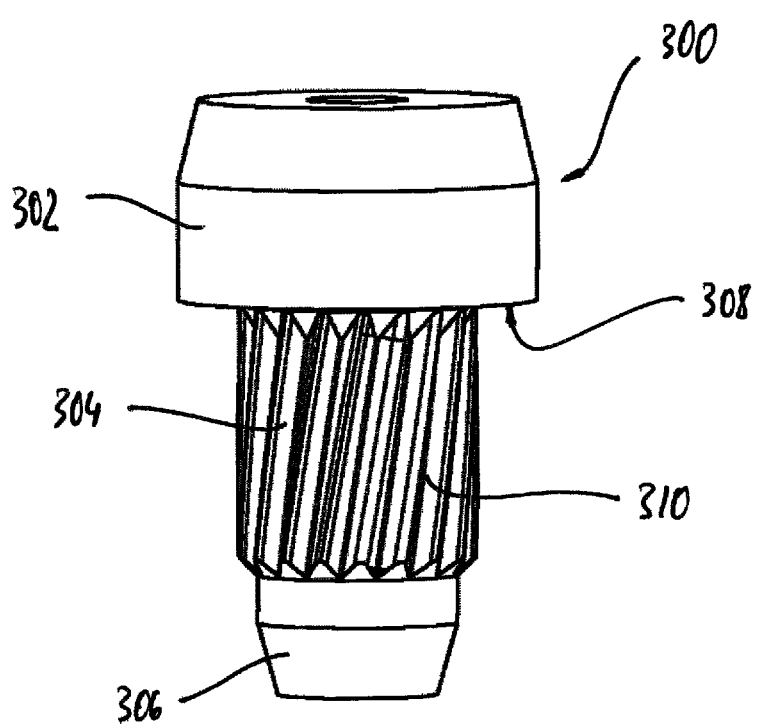
FIG. 3 counterbalances for balancing a driving collar of a duplex clutch.

FIG. 3 shows the counterbalance 300 for balancing a driving collar, such as the driving collar 102 according to FIG. 2 of a duplex clutch. The counterbalance 300 is in the form of a step pin with a head section 302, a shaft section 304, and a foot section 306. The counterbalance 300 has a greater diameter at its head section 302 than at its shaft section 304, and has a smaller diameter at its foot section 306 than at the shaft section 304. The counterbalance 300 is respectively embodied beveled at its ends. An axial contact area 308 for contacting an exterior of the driving collar is formed at the head section 302.

The shaft section 304 includes knurling radially at the outside. The shaft section 304 has ridges, such as 310, radially at the outside. The ridges 310 are arranged distributed at the shaft section in the circumferential direction. The ridges 310 are helically inclined by approx. 9° in the circumferential direction of the shaft section 304 in reference to a longitudinal axis of the counterbalance 300. The ridges 310 have a pitch such that the shaft section 304 is here not completely wrapped. The ridges 310 each have flanks with a flank angle of approx. 60° and a depth of approx. 8% in reference to an exterior diameter of the shaft section 304. As shown in FIG. 3, the ridges 310 are positioned on the shaft section 304 directly adjacent to the axial contact area 308.

For the assembly, the counterbalance 300 is impinged with force exclusively in the axial direction. The ridges 310 then cause the counterbalance 300 to rotate, so that the counterbalance 300 can be assembled like a screw, with here a rotary drive not being required. However, the ridges 310 serve not primarily for a form-fitting connection but primarily for reinforcing a friction-fitting connection. During operation of the duplex clutch any forces acting axially upon the counterbalance 300 are supported at the flanks of the ridges 310.

LIST OF REFERENCE CHARACTERS

100 Duplex clutch
102 Driving collar
104 Pressure plate
106 First compression plate
108 Second compression plate
110 First clutch disk
112 Second clutch disk
200 Driving collar
202 Counterbalance
204 Projection
300 Counterbalance
302 Head section
304 Shaft section
306 Foot section
308 Contact area
310 Ridges

The invention claimed is:

1. A counterbalance for balancing a part that is rotational about an axis of rotation, the counterbalance comprising:
a shaft section with a longitudinal axis,
a head portion including an axial contact area extending perpendicular to the longitudinal axis, and
a knurl with ridges inclined in reference to the longitudinal axis,
the ridges are positioned on the shaft section directly adjacent to the axial contact area,
wherein the ridges are inclined in reference to the longitudinal axis from approx. 3° to approx. 15°.

2. The counterbalance according to claim 1, wherein the ridges are wound about the longitudinal axis with a pitch that causes the shaft section to be only partially wrapped by each of the ridges.

3. The counterbalance according to claim 1, wherein the ridges respectively have a depth from approx. 6% to 10% in reference to an exterior diameter of the shaft section.

4. The counterbalance according to claim 1, wherein the counterbalance has a center of gravity, which is arranged in proximity to the shaft section.

5. The counterbalance according to claim 1, wherein the counterbalance is fixable at the part to be balanced in a friction-fitting and form-fitting fashion.

6. A counterbalance for balancing a part that is rotational about an axis of rotation, the counterbalance comprising:
a shaft section with a longitudinal axis,
a head portion including an axial contact area extending perpendicular to the longitudinal axis, and
a knurl with ridges inclined in reference to the longitudinal axis,
the ridges are positioned on the shaft section directly adjacent to the axial contact area,
wherein the ridges are wound about the longitudinal axis with a pitch that causes the shaft section to be only partially wrapped by each of the ridges.

7. The counterbalance according to claim 6, wherein the ridges respectively include flanks with a flank angle from approx. 40° to approx. 80°.

8. The counterbalance according to claim 6, wherein the ridges respectively have a depth from approx. 6% to 10% in reference to an exterior diameter of the shaft section.

9. The counterbalance according to claim 6, wherein the counterbalance has a center of gravity, which is arranged in proximity to the shaft section.

10. The counterbalance according to claim 6, wherein the counterbalance is fixable at the part to be balanced in a friction-fitting and form-fitting fashion.

11. A counterbalance for balancing a part that is rotational about an axis of rotation, the counterbalance comprising:
a shaft section with a longitudinal axis,
a head portion including an axial contact area extending perpendicular to the longitudinal axis, and
a knurl with ridges inclined in reference to the longitudinal axis,
the ridges are positioned on the shaft section directly adjacent to the axial contact area,
wherein the ridges respectively include flanks with a flank angle from approx. 40° to approx. 80°.

12. The counterbalance according to claim 11, wherein the ridges are inclined in reference to the longitudinal axis from approx. 3° to approx. 15°.

13. The counterbalance according to claim 11, wherein the counterbalance has a center of gravity, which is arranged in proximity to the shaft section.

14. The counterbalance according to claim 11, wherein the counterbalance is fixable at the part to be balanced in a friction-fitting and form-fitting fashion.

15. The counterbalance according to claim 11, wherein the ridges are wound about the longitudinal axis with a pitch that causes the shaft section to be only partially wrapped by each of the ridges.

16. A counterbalance for balancing a part that is rotational about an axis of rotation, the counterbalance comprising:
   a shaft section with a longitudinal axis,
   a head portion including an axial contact area extending perpendicular to the longitudinal axis, and
   a knurl with ridges inclined in reference to the longitudinal axis,
   the ridges are positioned on the shaft section directly adjacent to the axial contact area,
   wherein the ridges respectively have a depth from approx. 6% to 10% in reference to an exterior diameter of the shaft section.

17. The counterbalance according to claim 16 wherein the ridges are inclined in reference to the longitudinal axis from approx. 3° to approx. 15°.

18. The counterbalance according to claim 16, wherein the counterbalance has a center of gravity, which is arranged in proximity to the shaft section.

19. The counterbalance according to claim 16, wherein the counterbalance is fixable at the part to be balanced in a friction-fitting and form-fitting fashion.

20. The counterbalance according to claim 16, wherein the ridges are wound about the longitudinal axis with a pitch that causes the shaft section to be only partially wrapped by each of the ridges.

\* \* \* \* \*